(12) United States Patent
Owens, II et al.

(10) Patent No.: US 9,500,218 B2
(45) Date of Patent: Nov. 22, 2016

(54) ANCHORING FASTENER ASSEMBLY

(71) Applicant: ILLINOIS TOOL WORKS INC., Glenview, IL (US)

(72) Inventors: Ronald C. Owens, II, Lexington, KY (US); John D. Bisset, Lexington, KY (US); Jason D. Holt, Lexington, KY (US); Jeremy R. D. Tuttle, Dearborn, MI (US); Glenn G. Heavens, Cheshire, CT (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/357,711

(22) PCT Filed: Nov. 13, 2012

(86) PCT No.: PCT/US2012/064810
§ 371 (c)(1),
(2) Date: May 12, 2014

(87) PCT Pub. No.: WO2013/074511
PCT Pub. Date: May 23, 2013

(65) Prior Publication Data
US 2014/0271026 A1 Sep. 18, 2014

Related U.S. Application Data

(60) Provisional application No. 61/559,217, filed on Nov. 14, 2011.

(51) Int. Cl.
*F16B 43/00* (2006.01)
*F16B 39/02* (2006.01)
(Continued)

(52) U.S. Cl.
CPC ............... *F16B 39/026* (2013.01); *F16B 5/02* (2013.01); *F16B 37/065* (2013.01)

(58) Field of Classification Search
CPC ....... F16B 39/026; F16B 37/065; F16B 5/02
USPC ........................................................ 411/533
See application file for complete search history.

(56) References Cited

U.S. PATENT DOCUMENTS

RE17,907 E * 12/1930 Andren .................. B21K 1/702
29/512
1,883,906 A * 10/1932 Hasselquist ............ B21K 25/00
29/512
(Continued)

FOREIGN PATENT DOCUMENTS

FR 2618496 A1 1/1989
GB 2316457 A 2/1998

OTHER PUBLICATIONS

ISR and WO for PCT/US2012/064810 mailed Feb. 8, 2013.

*Primary Examiner* — Gary Estremsky
(74) *Attorney, Agent, or Firm* — Joseph M. Butscher; The Small Patent Law Group, LLC

(57) ABSTRACT

A fastener assembly is configured to secure to a component. The fastener assembly may include a fastener having a shaft integrally connected to an engagement head, and an anchoring bushing that retains the fastener. The anchoring bushing may include a main body defining a fastener passage that retains the shaft, and at least one anchoring member extending from a portion of the main body. The anchoring member(s) is configured to securely anchor into at least a portion of the component.

19 Claims, 3 Drawing Sheets

(51) Int. Cl.
*F16B 5/02* (2006.01)
*F16B 37/06* (2006.01)

(56) References Cited

U.S. PATENT DOCUMENTS

| | | | | |
|---|---|---|---|---|
| 1,954,761 A * | 4/1934 | Wiggin | ............... | A43C 15/165 |
| | | | | 36/59 R |
| 1,979,686 A * | 11/1934 | Hall | ............... | F16B 19/10 |
| | | | | 29/512 |
| 2,026,757 A * | 1/1936 | Swanstrom | ............... | 411/180 |
| 2,164,382 A * | 7/1939 | Burke | ............... | F16B 37/02 |
| | | | | 403/242 |
| 2,174,549 A | 10/1939 | Blaho | | |
| 3,014,609 A * | 12/1961 | Hobbs | ............... | B23P 19/062 |
| | | | | 174/565 |
| 3,365,998 A * | 1/1968 | Zahodiakin | ............... | F16B 19/10 |
| | | | | 411/183 |
| 3,728,761 A * | 4/1973 | Holly | ............... | 411/80.1 |
| 4,370,794 A * | 2/1983 | Bien | ............... | F16B 37/068 |
| | | | | 29/509 |
| 4,543,023 A * | 9/1985 | Capuano | ............... | F16B 37/068 |
| | | | | 411/180 |
| 4,621,961 A * | 11/1986 | Gulistan | ............... | 411/352 |
| 4,730,836 A * | 3/1988 | Miller et al. | ............... | 277/598 |
| 4,819,954 A * | 4/1989 | Fucci et al. | ............... | 277/598 |
| 4,940,375 A * | 7/1990 | Marvell | ............... | B23P 19/062 |
| | | | | 29/432.2 |
| 5,259,689 A * | 11/1993 | Arand et al. | ............... | 403/337 |
| 5,309,618 A * | 5/1994 | Muller | ............... | B23P 19/062 |
| | | | | 29/432.1 |
| 5,340,251 A * | 8/1994 | Takahashi | ............... | B21K 25/00 |
| | | | | 29/432.2 |
| 5,423,645 A * | 6/1995 | Muller et al. | ............... | 411/181 |
| 6,220,801 B1 * | 4/2001 | Lin | ............... | F16B 31/02 |
| | | | | 411/278 |
| 6,238,127 B1 * | 5/2001 | Jhumra et al. | ............... | 403/282 |
| 6,817,815 B2 * | 11/2004 | Ross | ............... | F16B 35/048 |
| | | | | 411/107 |
| 7,258,517 B2 * | 8/2007 | Ross | ............... | B23P 19/062 |
| | | | | 411/180 |
| 7,698,799 B2 * | 4/2010 | Parker | ............... | B23P 19/062 |
| | | | | 29/243.53 |
| 7,878,746 B2 * | 2/2011 | Babej | ............... | B21K 1/702 |
| | | | | 411/179 |
| 8,021,091 B2 * | 9/2011 | Bentrim | ............... | F16B 37/068 |
| | | | | 411/180 |
| 2003/0035700 A1 * | 2/2003 | Chiang | ............... | 411/303 |
| 2003/0039528 A1 * | 2/2003 | Yoon | ............... | 411/45 |
| 2004/0093712 A1 * | 5/2004 | Leistner | ............... | B23P 19/062 |
| | | | | 29/432.1 |
| 2008/0206013 A1 * | 8/2008 | Bentrim | ............... | F16B 37/068 |
| | | | | 411/180 |
| 2013/0189051 A1 * | 7/2013 | Diehl | ............... | F16B 19/08 |
| | | | | 411/190 |

* cited by examiner

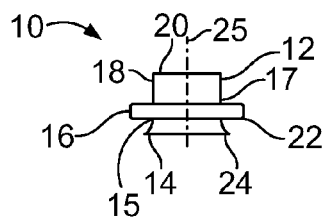
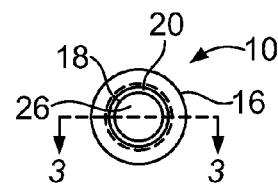
FIG. 1　　　　FIG. 2
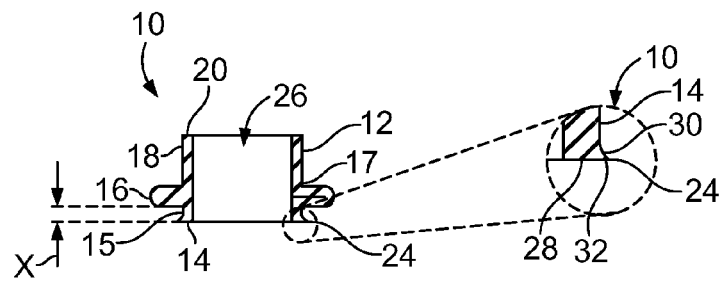
FIG. 3　　FIG. 4A　　FIG. 4B
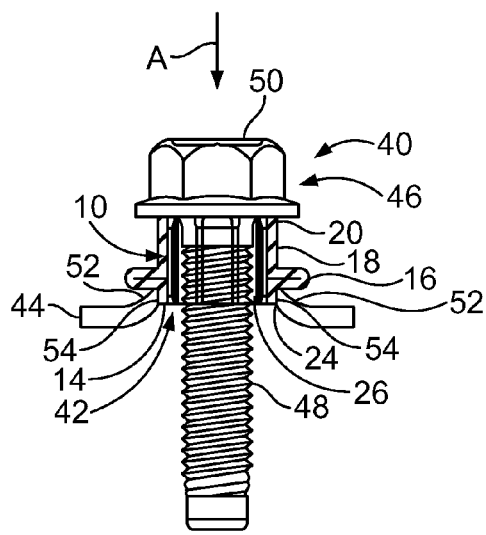
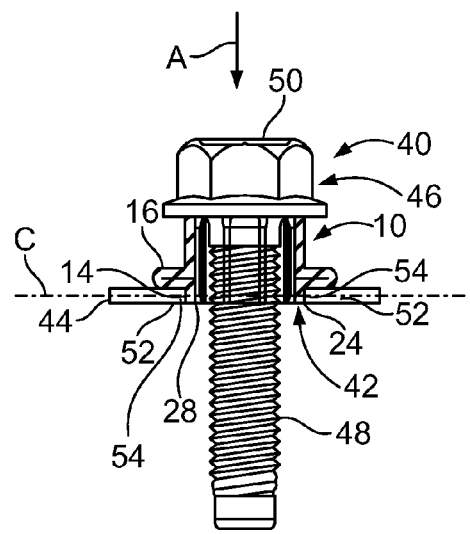
FIG. 5　　　　FIG. 6

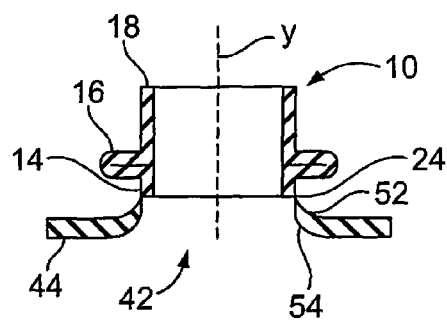
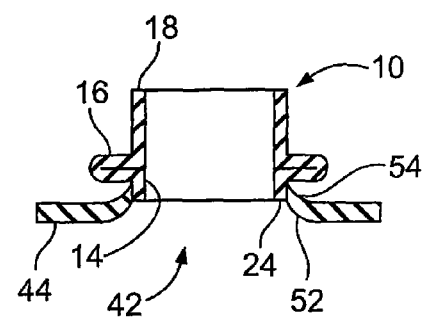
FIG. 7
FIG. 8
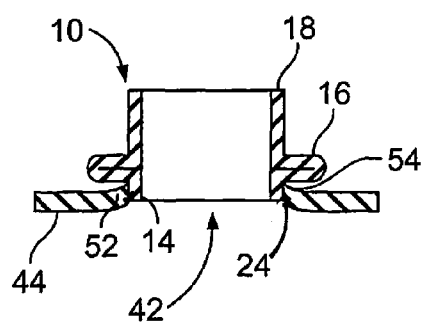
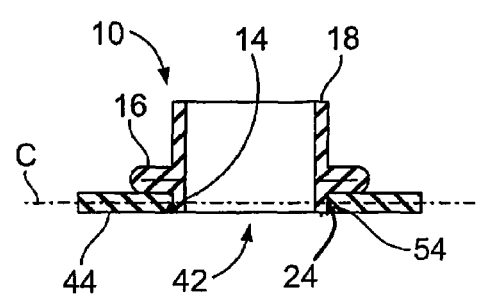
FIG. 9
FIG. 10

ANCHORING FASTENER ASSEMBLY

RELATED APPLICATIONS

This application is a National Phase of International Application Number PCT/US2012/064810 filed Nov. 13, 2012 and relates to and claims priority benefits from U.S. Provisional Patent Application No. 61/559,217 entitled "Fastener Assembly," filed Nov. 14, 2011, which is hereby incorporated by reference in its entirety.

FIELD OF EMBODIMENTS OF THE DISCLOSURE

Embodiments of the present disclosure generally relate to a fastener assembly, and more particularly to a fastener assembly including an anchoring bushing configured to securely lock or anchor to a structural component.

BACKGROUND

Fasteners are used to secure components together. In automotive applications, for example, fasteners may be used to secure one component, such as a door, to another component, such as a frame. Often, a component is secured to a planar sheet of material, such as a metal sheet of a vehicle frame, or the like. The fastener may force the metal sheet to bulge or otherwise protrude upon full engagement. For example, as the fastener is urged into the planar sheet of material, the force exerted into the fastener may cause the metal sheet to bulge outwardly about the through-hole into which the fastener is retained.

SUMMARY OF EMBODIMENTS OF THE DISCLOSURE

Embodiments of the present disclosure provide an anchoring fastener assembly that is configured to secure to a component, such as a panel, sheet, board, beam, or the like, in a flush manner on both sides of the component.

Certain embodiments of the present disclosure provide a fastener assembly configured to secure to a component. The fastener assembly may include a fastener having a shaft integrally connected to an engagement head, and an anchoring bushing that retains the fastener. The anchoring bushing may include a main body defining a fastener passage that retains the shaft, and at least one anchoring member extending from a portion of the main body. The anchoring member(s) is configured to securely anchor into at least a portion of the component.

The anchoring member(s) may extend radially outward from the portion of the main body. The anchoring member(s) may include one or more of a burr, tab, barb, or bayonet. The anchoring member(s) may include a rim that extends around at least a portion of a circumference of the main body. In an embodiment, the anchoring member(s) may include an outwardly-sloped wall connected to a sharp termination. The sharp termination is configured to dig into the component. In an embodiment, anchoring members are axially spaced apart from one another on the main body. In another embodiment, the anchoring member(s) may include at least one bendable tab. The bendable tab(s) is configured to be spread open to anchor the anchoring member to the component.

Certain embodiments of the present disclosure provide an anchoring bushing configured to securely anchor to a component and receive a fastener. The anchoring bushing may include a main body defining a fastener passage that is configured to retain a shaft of the fastener, and at least one anchoring member extending from a portion of the main body. The anchoring member(s) is configured to securely anchor into at least a portion of the component.

Certain embodiments of the present disclosure provide an anchoring bushing configured to securely anchor to a component and receive a fastener. The anchoring bushing may include a main body defining a fastener passage that is configured to retain a shaft of the fastener. The main body may include a component-insertion tube integrally connected to a fastener-receiving tube through a collar. The component-insertion tube is configured to be positioned within a through-hole of the component and the collar is configured to abut against areas of the component that define the through-hole. The anchoring bushing may also include at least one anchoring member extending from the component-insertion tube. The anchoring member(s) is configured to securely anchor into at least a portion of the component.

BRIEF DESCRIPTION OF SEVERAL VIEWS OF THE DRAWINGS

FIG. 1 illustrates a lateral view of an anchoring bushing, according to an embodiment of the present disclosure.

FIG. 2 illustrates a top plan view of an anchoring bushing, according to an embodiment of the present disclosure.

FIG. 3 illustrates a cross-sectional view of an anchoring bushing through line 3-3 of FIG. 2, according to an embodiment of the present disclosure.

FIG. 4a illustrates a close-up cross-sectional view of an anchoring member of an anchoring bushing, according to an embodiment of the present disclosure.

FIG. 4b illustrates a close-up cross-sectional view of anchoring members of an anchoring bushing, according to an embodiment.

FIG. 5 illustrates a partial cross-sectional view of a fastener assembly positioned within a through-hole of a planar component, according to an embodiment of the present disclosure.

FIG. 6 illustrates a partial cross-sectional of a fastener assembly secured to a planar component, according to an embodiment of the present disclosure.

FIG. 7 illustrates a cross-sectional view of an anchoring bushing aligned over a through-hole of a planar component, according to an embodiment of the present disclosure.

FIG. 8 illustrates a cross-sectional view of an anchoring bushing initially positioned within a through-hole of a planar component, according to an embodiment of the present disclosure.

FIG. 9 illustrates a cross-sectional view of an anchoring bushing urged into a through-hole of a planar component, according to an embodiment of the present disclosure.

FIG. 10 illustrates a cross-sectional view of an anchoring bushing fully secured and anchored to a planar component, according to an embodiment of the present disclosure.

Figure 11:
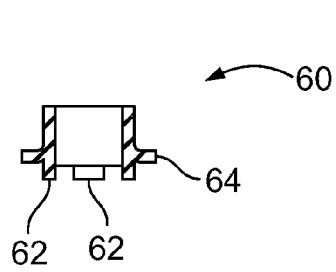
FIG. 11 illustrates a cross-sectional view of an anchoring bushing, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates a lateral view of an anchoring bushing 10, according to an embodiment of the present disclosure. The anchoring bushing 10 may be integrally formed as a single piece of material, such as metal, plastic, or the like. The anchoring bushing 10 includes a main body 12 having a component-insertion tube 14 with an upper end 15 integrally connected to a collar 16, which, in turn, integrally connects to a lower end 17 of a fastener-receiving tube 18. The component-insertion tube 14, the collar 16, and the fastener-receiving tube 18 define a fastener passage formed therethrough. The fastener passage is configured to receive a shaft of a fastener, and a fastener head is configured to abut against an upper exposed edge 20 of the fastener-receiving tube 18. A lower surface 22 of the collar 16 is configured to abut against a surface of a component, such as a planar sheet, into which the anchoring bushing 10 is configured to be positioned.

An anchoring member 24 outwardly and radially extends from a portion of the component-insertion tube 14. That is, the anchoring member 24 extends radially outward from an outer surface of the component-insertion tube 14 and away from a central longitudinal axis 25 of the component-insertion tube 14. The anchoring member 24 may be a barb, tab, burr, or other such protuberance. The anchoring member 24 may extend from a lower edge portion of the component-insertion tube 14. However, the anchoring member 24 may extend from any portion of the anchoring bushing 10 that is configured to engage an edge surface of a component that defines a through-hole. While a single anchoring member 24 is shown extending radially outward from a lower edge portion of the component-insertion tube 14, the anchoring bushing 10 may include more anchoring members 24 extending from various other portions of the component-insertion tube 14, the collar 16, or even the fastener-receiving tube 18. For example, a plurality of evenly-spaced anchoring members 24 may extend about a circumference of a lower edge of the component-insertion tube 14. Similarly, instead of individual anchoring members 24 spaced about the circumference, the anchoring member 24 may be a contiguous rim that extends about the circumference of the component-insertion tube 14, for example.

FIG. 2 illustrates a top plan view of the anchoring bushing 10. As shown in FIG. 2, a fastener passage 26 is formed through the anchoring bushing 10. The fastener passage 26 is configured to receive a shaft of a fastener.

FIG. 3 illustrates a cross-sectional view of the anchoring bushing 10 through line 3-3 of FIG. 2. As noted, the anchoring bushing 10 may be integrally formed from a single piece of material, and then stamped, pressed, and/or the like, to define the component-insertion tube 14, the collar 16, and the fastener-receiving tube 18. The collar 16 may be formed by folding and/or crimping a portion of the main body 12. The collar 16 generally has a larger diameter than a through-hole of a component, such as a planar sheet, while the diameter of the component-insertion tube 14 is generally less than that of the through-hole of the component. Accordingly, the component-insertion tube 14 is configured to pass into the through-hole, while the collar 16 prevents the anchoring bushing 10 from passing further into the through-hole. Additionally, the height x of the component-insertion tube 14 may be less than or equal to a thickness of a component into which the component-insertion tube 14 is secured.

FIG. 4a illustrates a close-up cross-sectional view of the anchoring member 24 of the anchoring bushing 10, according to an embodiment of the present disclosure. The anchoring member 24 may extend radially outward from a lower edge 28 of the component-insertion tube 14. The anchoring member 24 may include an outwardly angled or sloped wall 30 that terminates at a sharp termination 32, such as a point, edge, or the like. The sharp termination 32 is configured to dig into a lateral edge of a component that defines a through-hole. The anchoring member 24 may include a plurality of anchoring members 24. The plurality of anchoring members 24 may be evenly spaced about the circumference of the lower edge 28, for example. Alternatively, the anchoring member 24 may be a contiguous rim that extends around a portion or an entirety of the circumference of the lower edge 28. Additional anchoring members may be positioned axially over the anchoring member 24.

FIG. 4b illustrates a close-up cross-sectional view of anchoring members 24a and 24b of an anchoring bushing 10, according to an embodiment. As shown in FIG. 4b, anchoring members 24a and 24b extend radially outward from the anchoring bushing 10. The anchoring member 24a is positioned axially over the anchoring member 24b. While two anchoring members 24a and 24b are shown, additional anchoring members may extend from the anchoring bushing 10.

FIG. 5 illustrates a partial cross-sectional view of a fastener assembly 40 positioned within a through-hole 42 of a planar component 44, according to an embodiment of the present disclosure. The fastener assembly 40 includes a fastener 46 and the anchoring bushing 10. The fastener 46 may be a bolt, screw, or the like, having a shaft 48, which may be threaded, and an engagement head 50. The shaft 48 is positioned within the fastener passage 26 defined by the anchoring bushing 10, while the engagement head 50 is supported on the upper exposed edge 20 of the of the fastener-receiving tube 18.

The through-hole 42 may be formed by piercing the component 44. Accordingly, the through-hole 42 may be defined by upwardly-flared internal edges 52 of the component 44. During initial placement of the fastener assembly 40, the component-insertion tube 14 is positioned within the through-hole 42 such that anchoring member 24 abuts into exposed internal surfaces 54 of the upwardly-flared edges 52. The collar 16 rests over the upwardly-flared edges 52. As the fastener assembly 40 is urged into the component 44 in the direction of arrow A, the collar 16 forces the upwardly-flared edges 52 flat, while the anchoring member 24 digs into the exposed internal surfaces 54 of the upwardly-flared edges 52, thereby securely anchoring the anchoring member 24 to the component 44.

FIG. 6 illustrates a partial cross-sectional of the fastener assembly 40 secured to the planar component 44. As the fastener assembly 40 is urged into the component 44, the collar 16 forces the upwardly-flared edges 52 flat. As the edges 52 flatten, the diameter of the through-hole 42 decreases, which forces the anchoring member 24 to dig further into the internal surfaces 54. As such, the anchoring member 24 securely anchors the anchoring bushing 10, and therefore the fastener assembly 10, to the component 44. Moreover, the anchoring member 24 may provide a bracing, anchoring support that may prevent the collar 16 from being further urged in the direction of arrow A. As such, the fastener assembly 40 does not force the component to downwardly protrude around the through-hole 42. Instead, the anchoring member 24 provides a secure anchoring support for the fastener assembly 40, while at the same time ensuring that the lower edge 28 of the component-insertion tube 14 remains flush with an underside of the component 44. Internal edge portions of the component 44 that define the through-hole 42 are effectively captured and compressively sandwiched between the anchoring member 24 and the collar 16. As such, the component 44 does not bulge outside of a plane c when the fastener assembly 40 is securely fastened thereto. Further, because the height x (shown in FIG. 3) of the component-insertion tube 14 does not exceed the thickness of the component 44, the component-insertion tube 14 may not extend downwardly past the lower surface of the component 44.

FIG. 7 illustrates a cross-sectional view of the anchoring bushing 10 aligned over the through-hole 42 of the planar component 44. The component-insertion tube 14 is positioned over the through-hole 42. The anchoring bushing 10 is axially aligned about a central axis y of the through-hole 42.

FIG. 8 illustrates a cross-sectional view of the anchoring bushing 10 initially positioned within the through-hole 42 of the planar component 44. In the position shown in FIG. 8, the component-insertion tube 14 is initially positioned within the through-hole 42, such that the anchoring member 24 abuts against the internal surfaces 54 that define the through-hole 42.

FIG. 9 illustrates a cross-sectional view of the anchoring bushing 10 urged into the through-hole 42 of the planar component 44. As the collar 16 forces the upwardly-flared edges 52 to flatten, at least a portion of the internal surfaces 54 is driven toward the anchoring member 24, thereby forcing the anchoring member 24 to dig or bite into at least a portion of the internal surfaces 54.

FIG. 10 illustrates a cross-sectional view of the anchoring bushing 10 fully secured and anchored to the planar component 44. As the collar 16 forces the edges 52 to fully flatten, as shown in FIG. 10, the anchoring member 24 fully digs into the internal surfaces 54 about the through-hole 42, as the flattening forces the through-hole 42 to constrict about the circumference of the component-insertion tube 14. At least a portion of the edges 52 is captured between opposing axial forces exerted by the collar 16 and the anchoring member 24, thereby compressively sandwiching the portion(s) of the edges 52 therebetween, and ensuring that the edges 52 remain flat and within the plane c of the component 44.

Moreover, the designed and controlled manufactured anchoring member 24, such as a burr or barb radially extending from a periphery of the anchoring bushing 10, ensures a press fit engagement with the component 44. Accordingly, embodiments of the present disclosure provide a limiter that is locked in place once installed, and does not need to be removed or replaced, even for service.

Figure 12:
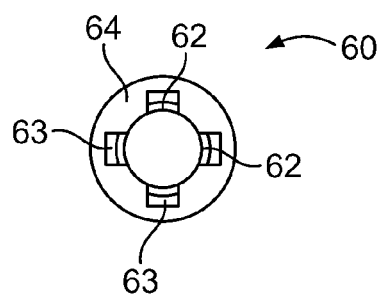
FIG. 12 illustrates a top plan view of an anchoring bushing, according to an embodiment of the present disclosure.

FIGS. 11 and 12 illustrate cross-sectional and top plan views, respectively, of an anchoring bushing 60, according to an embodiment of the present disclosure. The anchoring bushing 60 includes bendable anchoring members 62 extending downwardly from a collar 64. The anchoring members 62 may be tabs, barbs, clasps, or the like. The anchoring members 62 may be formed by being cut from the collar 64, and then downwardly bent, thereby forming channels 63 in the collar 64. The anchoring members 62 may be various shapes and sizes. The anchoring members 62 may be formed to be perpendicular to the collar 64. The anchoring members 62 may be evenly spaced about a circumference of the anchoring bushing 60. As shown, the anchoring bushing 60 includes four evenly-spaced anchoring members 62. However, the anchoring bushing 60 may include more or less anchoring members 62 than shown. Alternatively, the anchoring member 62 may be or include a bendable rim extending from the collar 64. When the anchoring members 62 are perpendicular with respect to the collar 64, the anchoring members 62 may form a component-insertion tube member or structure that is configured to be positioned within a through-hole of a component.

Figure 13:
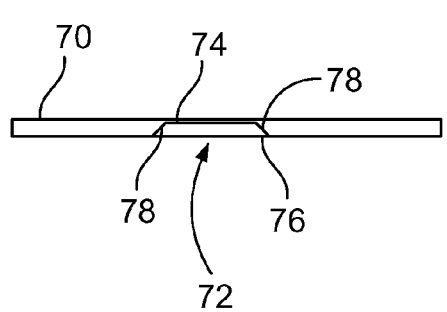
FIG. 13 illustrates a cross-sectional view of a planar component, according to embodiment of the present disclosure.

FIG. 13 illustrates a cross-sectional view of a planar component 70, according to embodiment of the present disclosure. The planar component 70 may include a countersink through-hole 72 having a receiving end 74 connected to a passage end 76. The diameter of the receiving end 74 may be smaller than the diameter of the passage end 76. Further, internal surfaces 78 that define the through-hole 72 may slope or angle from the receiving end 74 to the passage end 76.

Figure 14:
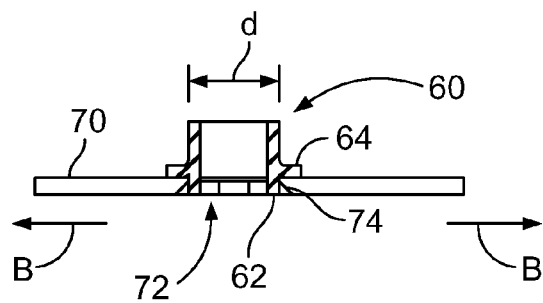
FIG. 14 illustrates a cross-sectional view of an anchoring bushing positioned within a countersink through-hole of a planar component, according to an embodiment.

FIG. 14 illustrates a cross-sectional view of the anchoring bushing 60 positioned within a countersink through-hole 72 of the planar component 70, according to an embodiment. The distance d between opposed anchoring members 62 is less than the diameter of the receiving end 74. The outer circumferential envelope defined by all of the anchoring members 62 is smaller than the area of the receiving end 74. As such, the anchoring members 62 may pass into the countersink through-hole 72, but the collar 64, which has a larger diameter than that of the countersink through-hole 72, is prevented from passing into the receiving end 74. Once the anchoring members 62 are positioned within the through-hole 72, the anchoring members 62 may be spread open in the directions of arrows B, to conform to the shape of the countersink through-hole 72. For example, the anchoring members 62 may be tabs that may be pivoted outwardly in the directions of arrows B about pivot points or areas proximate the collar 64. The anchoring members 62 may be spread open through a tool, for example.

Figure 15:
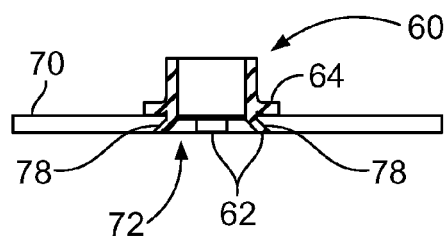
FIG. 15 illustrates a cross-sectional view of an anchoring bushing securely anchored within a countersink through-hole of a planar component, according to an embodiment.

FIG. 15 illustrates a cross-sectional view of the anchoring bushing 60 securely anchored within the countersink through-hole 72 of the planar component 70, according to an embodiment. As shown in FIG. 15, the anchoring members 62 have been spread open and conform to the sloped internal surfaces 78 that define the countersink through-hole 72. Because the anchoring members 62 are spread open, the anchoring members 62 are prevented from retreating or otherwise ejecting with respect to the through-hole 72. As such, the anchoring members 62, and therefore the anchoring bushing 60, are securely anchored to the component 70. The anchoring members 62 and the collar 16 cooperate to ensure that the lower edge of the anchoring bushing 60 remains flush with the lower surface of the component 70, as described above. For example, edge portions of the component 70 that define the through-hole 72 are compressively sandwiched between the collar 64 and the anchoring members 62.

Referring to FIGS. 1-15, while the anchoring bushings are described as securing to a planar component, such as a sheet, plate, beam, or the like, the anchoring bushings may be configured to secure to various other components of different shapes and sizes. For example, the anchoring bushings and fastening assemblies described may secure to arcuate, spherical, and/or irregularly-shaped components. The anchoring bushings and fastener assemblies described are configured to secure a component to another structure, component, or the like, no matter the size and shape of the component(s).

The anchoring bushings and fastener assemblies described with respect to FIGS. 1-15 may be used to securely engage components formed of various materials, such as metal, plastic, any combination thereof, and/or other materials. Further, the anchoring bushings and fastener assemblies may be used with respect to various through-holes in addition to pierced and countersunk through-holes. In short, the anchoring bushings and fastener assemblies may be used with any components having any shaped and/or formed through-hole(s).

Embodiments of the present disclosure provide fastener assemblies and anchoring bushings that are configured to securely anchor to a component in a flush manner on both sides of the component. Embodiments of the present disclosure provide fastener assemblies and anchoring bushings that protect a component from undesirably bowing, protruding, or the like at or around areas in which the fastener assemblies and bushing assemblies secure.

Embodiments of the present disclosure provide fastener assemblies and anchoring bushings that are configured to allow fastener(s) to be transported to an end user already pre-installed into a component, for example. Additionally, embodiments of the present disclosure provide fastener assemblies and anchoring bushings that provide a flush mount without any bulging, bowing, or other such protrusions.

As described above, embodiments of the present disclosure provide fastener assemblies having anchoring bushings that engage structural areas that define through-holes. The anchoring bushings are configured to dig in, lock and/or otherwise anchor the anchoring bushings, and therefore, the assemblies, into the through-holes. To ensure a tight press fit into components, the anchoring bushings include at least one anchoring member, such as a burr, tab, barb, bayonet, ridge, rim, or the like that is configured to dig into, bite into, or otherwise securely anchor into material surrounding through-holes.

In comparison to known fasteners assemblies, embodiments of the present disclosure use less material, and therefore are lighter, while at the same time robust and reliable. The folded over collar, as shown in FIG. 3, for example, allows use of a thin metal sheet to form the anchoring bushing. The anchoring member ensures that the anchoring bushing anchors in place with respect to a component. Because the fastener assemblies and anchoring bushings shown and described use less material, as compared to previous assemblies, manufacturing costs are reduced.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A fastener assembly secured to a component having opposed outer planar surfaces and a through-hole extending between and through the opposed outer planar surfaces, wherein the through-hole is defined by an internal edge formed through the component, the fastener assembly comprising:
a fastener having a shaft integrally connected to an engagement head; and
an anchoring bushing that retains the fastener, wherein the anchoring bushing includes a main body defining a fastener passage that retains the shaft, and at least one anchoring member extending from a portion of the main body, wherein the at least one anchoring member comprises a contiguous rim that extends around a circumference of the main body, wherein the contiguous rim comprises an outwardly-sloped wall connected to a sharp termination, wherein the sharp termination is dug into the internal edge that defines the through-hole of the component, wherein a diameter of the outwardly-sloped wall expands toward a terminal end that includes at least a portion of the outwardly-sloped wall, wherein the at least one anchoring member securely anchors into at least a portion of the component by digging into the internal edge of the component that defines the through-hole formed through the component.

2. The fastener assembly of claim 1, wherein the at least one anchoring member extends radially outward from the portion of the main body.

3. The fastener assembly of claim 1, wherein the at least one anchoring member comprises one or more of a burr, tab, or barb.

4. The fastener assembly of claim 1, wherein the at least one anchoring member comprises a plurality of anchoring members axially spaced apart on the main body, wherein a first anchoring member is positioned axially over a second anchoring member.

5. The fastener assembly of claim 1, wherein the main body comprises a collar.

6. The fastener assembly of claim 1, wherein the sharp termination comprises a circumferential pointed edge.

7. The fastener assembly of claim 1, wherein the sharp termination provides a means for digging into the internal edge.

8. An anchoring bushing securely anchored to a component and configured to receive a fastener, wherein the component includes opposed outer planar surfaces and a through-hole extending between and through the opposed outer planar surfaces, wherein the through-hole is defined by an internal edge formed through the component, the anchoring bushing comprising:
  a main body defining a fastener passage that is configured to retain a shaft of the fastener; and
  at least one anchoring member extending from a portion of the main body, wherein the at least one anchoring member comprises a contiguous rim that extends around a circumference of the main body, wherein the contiguous rim comprises an outwardly-sloped wall connected to a sharp termination, wherein the sharp termination is dug into the internal edge that defines the through-hole of the component, wherein a diameter of the outwardly-sloped wall expands toward a terminal end that includes at least a portion of the outwardly-sloped wall, wherein the at least one anchoring member securely anchors into at least a portion of the component by digging into the internal edge of the component that defines the through-hole formed through the component.

9. The anchoring bushing of claim 8, wherein the at least one anchoring member extends radially outward from the portion of the main body.

10. The anchoring bushing of claim 8, wherein the at least one anchoring member comprises one or more of a burr, tab, or barb.

11. The anchoring bushing of claim 8, wherein the at least one anchoring member comprises a plurality of anchoring members axially spaced apart on the main body, wherein a first anchoring member is positioned axially over a second anchoring member.

12. The anchoring bushing of claim 8, wherein the main body comprises a collar.

13. The anchoring bushing assembly of claim 8, wherein the sharp termination comprises a circumferential pointed edge.

14. The anchoring bushing assembly of claim 8, wherein the sharp termination provides a means for digging into the internal edge.

15. A system comprising:
  a component including opposed outer planar surfaces and a through-hole extending between and through the opposed planar surfaces, wherein the through-hole is defined by an internal edge formed through the component;
  an anchoring bushing securely anchored to the component and configured to receive a fastener, the anchoring bushing comprising:
  a main body defining a fastener passage that is configured to retain a shaft of the fastener, wherein the main body comprises a component-insertion tube integrally connected to a fastener-receiving tube through a collar, wherein the component-insertion tube is positioned within the through-hole formed through the component and the collar abuts against areas of the component surrounding the through-hole; and
  at least one anchoring member extending from the component-insertion tube, wherein the at least one anchoring member comprises a contiguous rim that extends around an entire circumference of the main body, wherein the contiguous rim comprises an outwardly-sloped wall connected to a sharp termination, wherein the sharp termination is dug into the internal edge that defines the through-hole of the component, wherein a diameter of the outwardly-sloped wall expands toward a terminal end that includes at least a portion of the outwardly-sloped wall, wherein the at least one anchoring member securely anchors into at least a portion of the component by digging into the internal edge of the component that defines the through-hole formed through the component.

16. The system of claim 15, wherein the at least one anchoring member comprises one or more of a burr, tab, or barb.

17. The system of claim 15, wherein the at least one anchoring member comprises a plurality of anchoring members axially spaced apart on the main body, wherein a first anchoring member is positioned axially over a second anchoring member.

18. The system of claim 15, wherein the sharp termination comprises a circumferential pointed edge.

19. The system of claim 15, wherein the sharp termination provides a means for digging into the internal edge.

* * * * *